United States Patent [19]
Willey et al.

[11] Patent Number: 6,152,128
[45] Date of Patent: Nov. 28, 2000

[54] EASILY-ASSEMBLED PORTABLE FORCED-AIR HEATER WITH REDUCED NUMBER OF COMPONENTS

[75] Inventors: John R. Willey; Eric M. Kaltenmark, both of Bowling Green, Ky.

[73] Assignee: DESA International, Bowling Green, Ky.

[21] Appl. No.: 09/395,839

[22] Filed: Sep. 14, 1999

[51] Int. Cl.[7] .................................................. F24H 3/02
[52] U.S. Cl. ................. 126/110 B; 126/110 C; 126/110 D; 126/110 R; 29/890.02
[58] Field of Search .................. 432/222; 126/110 B, 126/110 C, 110 D, 110 R; 29/890.02, 596, 509, 413, 557, 890.14; 310/89; 415/215.1

[56] References Cited

U.S. PATENT DOCUMENTS

| | | | |
|---|---|---|---|
| 1,833,747 | 11/1931 | Haughton | 29/596 |
| 2,112,747 | 3/1938 | Wood | 29/596 |
| 2,800,893 | 7/1957 | Norman et al. | 126/9 R |
| 3,035,566 | 5/1962 | Keeney | 126/9 R |
| 3,319,947 | 5/1967 | Truesdell | 126/110 R |
| 3,728,881 | 4/1973 | Coop | 29/509 |
| 3,802,414 | 4/1974 | Lee | 431/350 |
| 4,089,642 | 5/1978 | Briggs et al. | 126/110 B |
| 4,309,815 | 1/1982 | Schmitt et al. | 29/596 |
| 4,532,914 | 8/1985 | Thomas et al. | 126/110 B |
| 4,739,206 | 4/1988 | Sieber | 29/596 |
| 4,897,023 | 1/1990 | Bingler | 310/89 |
| 5,299,350 | 4/1994 | Lyle et al. | 29/596 |
| 5,307,800 | 5/1994 | Lee, Jr. | 126/110 B |
| 5,426,337 | 6/1995 | Kobayashi et al. | 29/596 |
| 5,503,138 | 4/1996 | Chang | 126/9 R |
| 5,848,585 | 12/1998 | Long et al. | 126/110 B |
| 5,877,576 | 3/1999 | CoChimin | 310/89 |
| 5,881,992 | 3/1999 | Evertowski et al. | 29/596 |
| 5,909,916 | 6/1999 | Foster et al. | 29/505 |
| 6,011,335 | 1/2000 | Belley | 310/89 |

Primary Examiner—Ira S. Lazarus
Assistant Examiner—David Lee
Attorney, Agent, or Firm—Jones, Day, Reavis & Pogue

[57] ABSTRACT

A portable forced air heater includes a one-piece unichassis structure which forms the base and the outer housing of the heater. The outer housing defines an elongated passage having a front end and a back end and which receives a burner assembly. The burner assembly is spaced from the outer housing such that cooling air flows between the combustion chamber of the burner assembly and the outer housing. The burner assembly itself includes the elongated combustion chamber which is shorter than the air passage defined by the outer shell and includes a rear head member which is snapped into place in the inlet end of the combustion chamber. Self-aligning mounting tabs and brackets are formed in both the unichassis and the combustion chamber to significantly reduce the number of parts and to simplify construction.

24 Claims, 3 Drawing Sheets

6,152,128

EASILY-ASSEMBLED PORTABLE FORCED-AIR HEATER WITH REDUCED NUMBER OF COMPONENTS

BACKGROUND OF THE INVENTION

1. Field of the Invention

The present invention relates to forced-air heaters and more particularly, to portable forced-air heaters which use fewer components and are simple to assemble. According to a preferred embodiment, both the base and outer shell are formed as a unichassis from a single sheet of pre-painted metal, while the combustion chamber is formed of a single sheet of a second sheet of metal. Aligning tabs and brackets are formed as an integral part of both the unichassis and the combustion chamber. Further, disruption and/or deformation of the metal forming the unichassis and the combustion chamber is used to fasten metal to metal and to retain one component in a pre-determined position with respect to a second component.

2. Description of Related Art Including Information Disclosed Under 37 CFR 1.97 and 1.98

Portable forced-air heaters which typically burn fuels such as kerosene and preferably propane are used extensively at construction sites and outdoor sporting events. They are lightweight, easy to carry, and are unusually safe considering the significant amount of heat they can provide almost instantaneously.

However, although rather simple in concept, presently available heaters use a large number of components which must be assembled and consequently, increase the cost to manufacture the heater. Furthermore, because of the amount of heat provided and operation of the heaters in close proximity to people in combustible building materials, it is extremely important that the outer shell remain cool enough to touch without danger, and that the support surface (e.g. the floor) for the heater (which may be combustible) must not be subjected to excessive heat. Therefore, these portable heaters typically use a flow of unheated air to maintain safe operating conditions. For example, a flow of unheated air is directed onto the floor or support surface to avoid overheating. In addition, a flow of air is provided between the outer shell of the heater and the combustion chamber to maintain the temperature of the outer shell safe to touch. To maintain a properly-directed and continuous flow of air, the location of the heater components with respect to each other is very important. Consequently, because of the large number of components that must be carefully assembled, the labor costs for manufacturing is significant.

A typical prior art portable heater is disclosed in U.S. Pat. No. 5,848,585 to Norris R. Law and Clyde R. Schulte.

SUMMARY OF THE INVENTION

Therefore, it is an object of the present invention to provide a portable forced-air heater which requires fewer components for manufacturing.

It is another object of the invention to provide a portable forced-air heater which is easy and quick to assemble.

These and other objects are achieved in the present invention by a forced-air heater which comprises a one-piece unichassis structure which forms a base and an outer housing. The outer housing defines an elongated passage with a front end and a back end. The outer housing supports a burner assembly, which includes an elongated combustion chamber defined by outer walls and has an inlet and an outlet end. The length of the elongated combustion chamber is shorter than the elongated passage of said outer shell. Further, the combustion chamber is located within and at a selected spacing from the elongated passage of the outer shell to define an air passage around the combustion chamber. A rear head member cooperates with the inlet end of the combustion chamber and in a preferred embodiment is planar and defines a substantially centrally-located opening. A combustion mixture supply member such as, for example, a supply tube, is positioned in the opening of the rear head member for supplying a combustible mixture of fuel and air for combustion in the combustion chamber. A fan unit is mounted to the back end of the outer shell and supplies a flow of air through the air passage which surrounds and cools the combustion chamber and also provides a flow of air directed to the floor or the surface supporting the portable heater at a location in front of the heater.

In a preferred embodiment, both the unichassis structure and the combustion chamber are punched by a press from single sheets of metal and are scored at bend lines so that they can readily be bent into the desired shape either manually or by machine.

BRIEF DESCRIPTION OF THE DRAWINGS

These and other features of the present invention will be more fully disclosed when taken in conjunction with the following Detailed Description of the Invention in which like numerals represent like elements and in which.

DETAILED DESCRIPTION OF THE INVENTION

Figure 1:
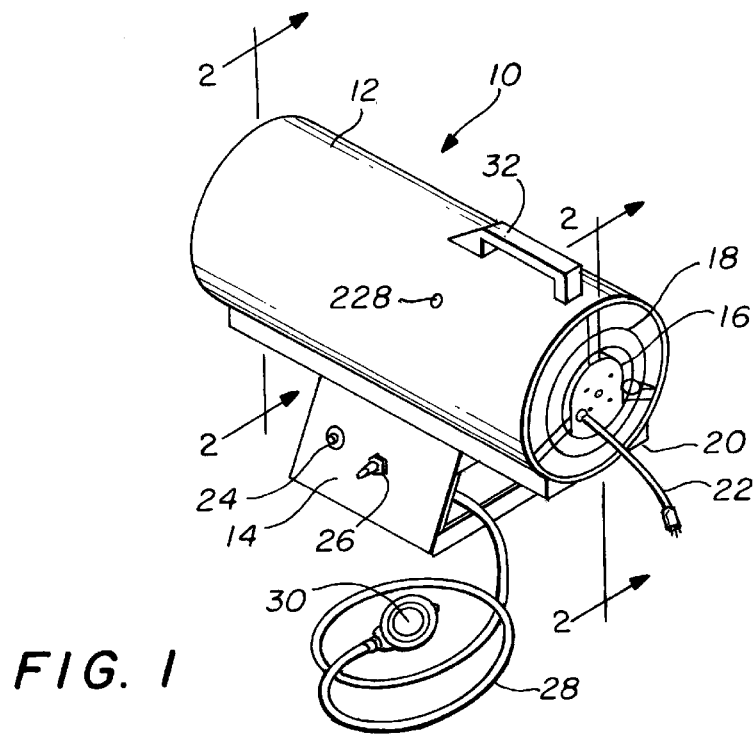
FIG. 1 is a perspective view of a forced-air heater incorporating the teachings of the present invention.

Referring now to FIG. 1, there is shown a perspective view of a forced-air heater incorporating the teachings of the present invention. As shown, the heater includes a unichassis structure 10 comprised of an outer shell portion 12 and a base portion 14. A fan with a motor 16 for providing a flow of air, as will be discussed later, is mounted to a wire support bracket 18, which in turn, is mounted to the outer shell 12 of unistructure 10. In a preferred embodiment, the unistructure 10 further includes a channel or trough portion 20, located between the outer shell 12 and the base 14. Typically, the fan motor 16 is driven by AC power as indicated by power cord 22. In the preferred embodiment there is also included a means for igniting the mixture of a combustible fluid and air such as by a piezoelectric spark generator which is activated by a push-button switch 24. There is also included a start-up manual push-button valve 26 which allows fuel to be provided to the combustion chamber during start-up, as will be discussed later. Also shown is a fuel line or tubing 28, having a connection valve 30, which typically would be connected to a propane tank not shown. Also typically included in the preferred embodiment is a handle 32 attached to the top of the outer shell 12.

Figure 2:
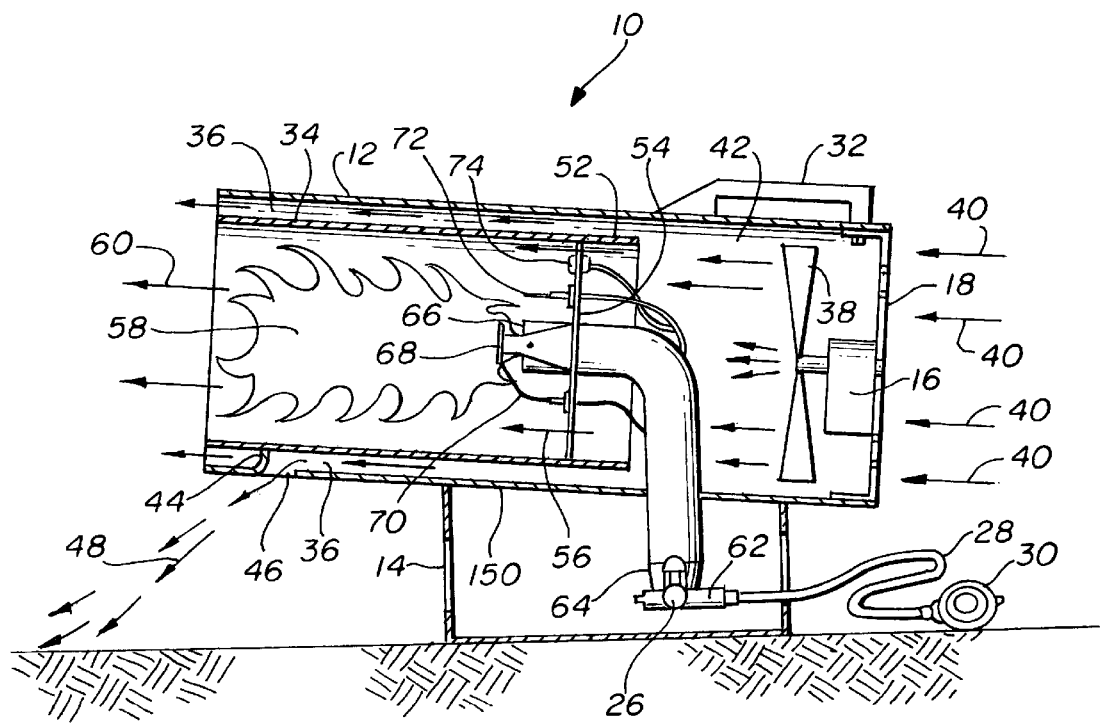
FIG. 2 is a simplified cross-sectional view of the heater of FIG. 1 taken along lines 2—2.

Referring now to FIG. 2, there is shown a simplified cross-sectional view of the portable forced-air heater of FIG.

1, taken along view lines 2—2. The simplified view of FIG. 2 is primarily provided for aiding in the understanding of the operation of the portable heater of this invention and to help describe some of the features of the invention. As shown, there is a combustion chamber 34 supported inside of the outer shell 12 and spaced apart from outer shell 12 so as to provide an air passage 36, which substantially surrounds combustion chamber 34. Thus, when the fan 38 driven by electrical motor 16 moves a large volume of air, such as indicated by the dark arrows 40, through the wire support bracket 18 and into the air chamber 42, a portion of the air from fan 38 passes through the air passage 36 which surrounds the combustion chamber 34 and provides cooling air which insulates the outer shell 12 from combustion chamber 34. Consequently, the outer shell 12 will remain at a temperature which is not dangerous to the touch. A portion of the air traveling through air passage 36 will impact air diverter 44 at the bottom of the outer shell 12. The air leaving the slot 46, as indicated by arrows 48, is directed to the support surface or flooring in front of the portable air heater to avoid overheating the support structure 50 which may be made of a combustible material such as wood. Another portion of the air from fan 38 is collected by a rear-end extending portion 52 of the combustion chamber 34 and passes through slots or holes in rear head member 54. The air passing through rear head member 54, as indicated by arrow 56, provides the moving forced air which is heated by the combustion of fuel, as indicated by flame pattern 58, and which exits as heated air, as indicated by the large arrow 60.

As was discussed heretofore, the combustible fuel such as propane is supplied by tubing 28 to a valve mechanism 62 where it is mixed with air in burner tube 64, which extends from valve mechanism 62 through an opening located centrally in rear head member 54 to provide the unignited fuel air mixture at the end 66 of burner tube 64. As shown, a target member 68 is mounted to rear head member 54 and diverts the combustible fuel air mixture in a radial direction. The unignited fuel air mixture leaving the tube 66 is then ignited and burned, as indicated by the flame 58. The fuel air mixture is initially ignited by a spark which leaves electrode 70 and jumps to a grounded metal portion of the heater, such as for example, the side walls of end 66 of burner tube 64, or the, target 68. The spark leaving electrode 70, as was discussed heretofore, is provided by a piezoelectric spark generator in response to manual activation of button 24 (not shown in FIG. 2). Also shown is a thermocouple 72, which maintains the valve assembly 62 in an ON or open condition after the thermocouple is sufficiently heated by the burning fuel and air mixture. Until the thermocouple 72 is sufficiently heated, fuel is supplied through valve 62 by manually controlling the valve by push button 26. Lastly, there is a thermostat indicated by reference number 74 connected serially between the thermocouple 72 and the valve 62, such that if the rear head member is heated past a predetermined threshold, the current flow from the thermocouple 72 will be interrupted and valve 62 will close, thereby interrupting the gas flow through valve 62 to shut down the heater.

Figure 3:
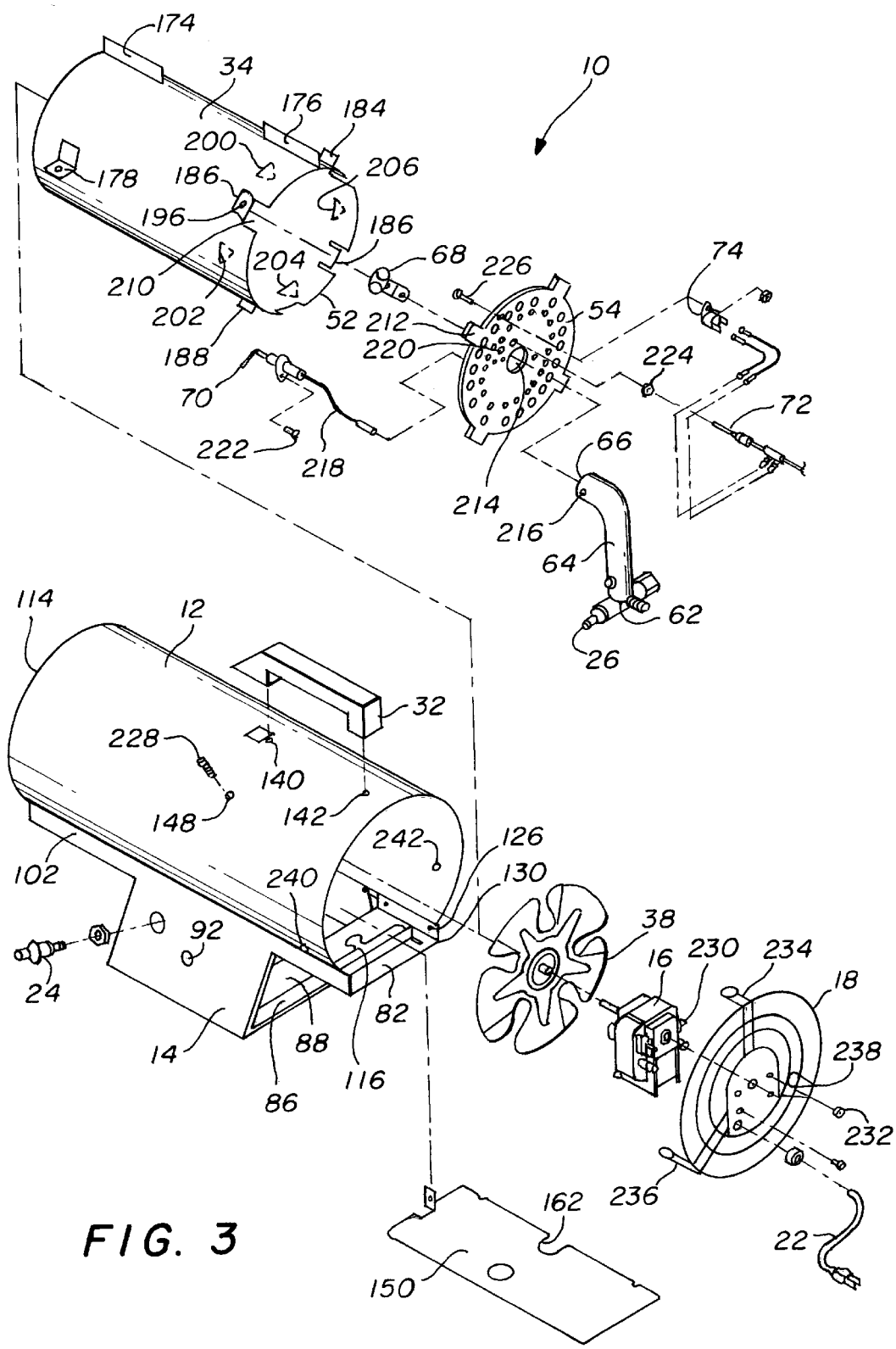
FIG. 3 is an exploded perspective view of components making up the forced air heater of FIG. 1.
Figure 4:
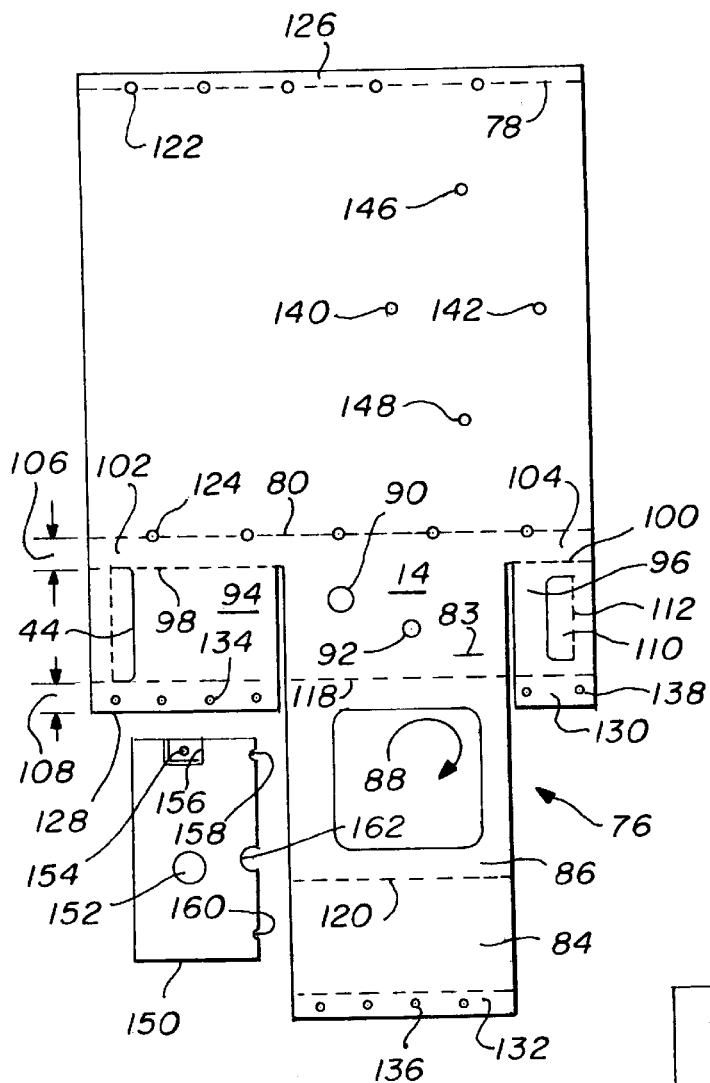
FIG. 4 shows one embodiment of a pre-form of the unichassis of this invention cut or punched from a single sheet of metal.

Referring now to FIG. 3, there is shown an exploded perspective view of the forced-air heater of the present invention. As was briefly discussed with respect to FIG. 1, the heater of this invention uses a unichassis structure 10 which includes an outer shell 12 and a base 14. The unistructure 10 is formed out of a single sheet of metal and then bent or formed to provide the unichassis. FIG. 4 shows an example of the unichassis "pre-form" as it exists before it is bent into the shape shown in FIG. 3. As shown, in a preferred embodiment, the pre-form is cut, or preferably punch-pressed, from a single sheet of material 76 and which single sheet of material is preferably pre-painted. As shown in the embodiment of FIG. 3, the outer shell portion 12 is bent in a cylindrical form. However, it should be appreciated the outer shell 12 could have other cross-sectional shapes than cylindrical such as, for example square, hexagonal or octagonal. The outer shell portion 12 also includes crease lines 78 and 80, which partially forms an air channel or trough 82, more clearly shown in FIG. 3. As shown, the base portion 14 of the unichassis includes a front face 83, a rear face 84 and a bottom portion or structure 86. The bottom portion 86 defines a cut out 88 which may be used for accessing some of the components for maintenance and/or repair. As shown, the front face 83 includes a pair of orifices 90 and 92 for receiving the push button 24 for activating the piezoelectric spark generator and the manual control button 26 on control valve 62, respectively. A portion of the bottom of the air channel or trough 82 is formed by bending flaps 94 and 96 along bend lines 98 and 100, respectively. The depth of the air channel or trough 82 is determined by the width of the material or portions 102 and 104 between the bend line 80 and the bend lines 98 and 100 respectively, as indicated by double-headed arrow 106 and between and the bend line 118 and the edges of flaps 94 and 96 as indicated by double headed arrow 108. Also as shown, air diverter 44, more clearly seen in the cross-sectional view of FIG. 2, is formed in flap 94 and an auxiliary air inlet opening is formed by bending flap 110 along bend line 112. It will be appreciated by those skilled in the art and familiar with portable forced-air heaters, that in prior art heaters, if the air inflow through wire support bracket 18 were to become obstructed, insufficient oxygen will reach the burning fuel and the flame would often move to the outside or front edge 114 of the heater. After the flame moves outside of the combustion chamber, although counter-intuitive, the temperature inside the heater increases until it exceeds the thermostat 74 set point. Thermostat 74 then turns OFF the supply of fuel and shuts down the heater. Thus, it has been found that auxiliary inlet 116 formed by flap 112 of metal portion 96, although not necessarily providing sufficient air for the best operation of the heater will provide enough air to keep the flame internal to the heater, thereby preventing an external flame, overheating, and shutdown.

It will be appreciated that the base portion 14 of the unichassis is formed by bending along the bend lines 118 and 120 to form a substantially trapezoidal cross-sectional base as shown in FIG. 3. Gusset 122 along bend line 78 and gusset 124 along bend line 80 are formed in unichassis 10 during a pre-roll to provide stability to the angle of bend between the metal forming the outer shell 12 and the sides of the air channel or trough, as indicated by referenced number 102. To form the cylindrical shape of the outer shell 12, the metal is rolled in a press between the bend lines 78 and 80, as discussed above. Thus, it will be appreciated that when the base 14 and air channel or trough 82 are properly bent into position, the edge 126 or the main portion of the outer shell 12 may be moved into contact with the edge 128 of flap 94, edge 130 of flap 96 and edge 132 of base side 84 to form the cylindrical shape as shown in FIG.3. As will be discussed later, edge 126 will be fastened to edges 128, 130, and 132 to form a closed shell when assembly is complete. It will further be appreciated, although any fastening means such as rivets, brads, screws, or spot welding, may be used to fasten edge 126 to its corresponding edges 128, 130, and 132, according to the present invention, either edge 126 or the edges 128, 130, and 132 will include holes such as holes 134 in flap 94, 136 in side 84 and holes 138 in flap 96. Thus, when it is ready to close the cylinder, edge 126 is moved into contact with edges 128, 130, and 132 and some of the metal in edge 126 is deformed or disrupted through the holes, such as holes 134, 136, and 138, to securely and permanently fasten the edges together. Also as shown, the outer shell 12 includes holes 140 and 142 for attaching handle 32. It will be appreciated that once the unichassis is fully formed and secured in position, the holes 140 and 142 will be at the top of the outer shell. Also included are holes 146 and 148 which, as will be discussed later, are for mounting the self-aligning brackets formed on the combustion chamber 34.

Referring again to FIGS. 3 and 4, there is also shown a separator plate 150. As will be discussed hereinafter with respect to the assembly of the portable gas heater of this invention, separator plate 150 forms the bottom of the air channel or trough 82 between the base 14 and the outer shell. It will be appreciated that since metal flaps 94 and 96 form a portion of the trough, there would be no such trough floor in the base area without the separator 150. As shown in FIG. 4, it will be appreciated that the separator plate 150 may be cut or press-punched from the scrap material from which the unichassis itself is cut. Also as shown, the separator plate 150 defines and orifice or opening 152 through which the combustion or burner tube 64 passes on its way to the rear head 54. There is also included a mounting tab 156 which is bent along bend line 156. A pair of notches 158 and 160 help properly orient and stabilize the separator plate in position and another larger notch 162 provides an opening for routing the wiring to the spark electrode 70 and the thermocouple and thermostat 72 and 74, respectively.

Figure 5:
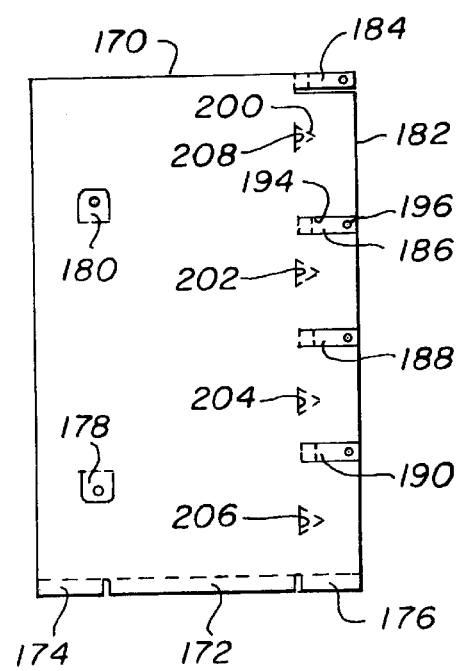
FIG. 5 shows one embodiment of a pre-form of the combustion chamber cut or punched from a single sheet of metal.

Referring now to FIGS. 3 and 5, there is shown an exploded view and a view of the "pre-form" used in constructing the combustion chamber 34 respectively. As shown in FIG. 5, the pre-form of the combustion chamber 34 is cut or punch-pressed from a sheet of galvanized metal which can withstand the heat of the burner without the metal crystallizing and/or becoming brittle. As shown, the combustion chamber 34 is preferably cylindrical shaped but could, of course, have substantially any other cross-sectional area such as hexagonal or octagonal shape. The cylindrical shape of the combustion chamber 34 as shown in FIG. 3 is achieved by rolling the punched sheet such that edges 170 and 172 meet. Prior to this, standoff ears 174 and 176 are bent radially outward to provide alignment of the combustion chamber 34 centrally within the outer shell 12 of the burner. Once rolled together, the main portion of edge 172 and edge 170 are securely fastened together such as by screws, spot welding, rivets, metal disruption, etc. In addition to standoff ears 174 and 176, tabs 178 and 180 are also provided to maintain the self-alignment of the combustion chamber within the outer shell 12, by bending tabs 178 and 180 radially from combustion chamber 34. In addition, at the inlet end 182 of the combustion chamber there are included a plurality of metal ears 184, 186, 188, and 190 which serve as both standoff tabs and mounting brackets. To form the combination standoff tab/mounting bracket such as shown in FIG. 3, the tab 186 is bent radially outward at bend line 192 and then bent again at the bend line 194 such that the portion of the tab 186 with the mounting hole 196 can be aligned with the mounting hole 148 in the outer shell 12. Although not shown in FIG. 3, there will be three additional mounting holes such as mounting hole 146 in the outer shell 12 for securing the self-aligning combustion chamber 34 within the outer shell 12. However, prior to combustion chamber 34 being positioned and secured within outer shell 12 of the unichassis 10, it is preferable to finish assembly of the burner assembly. Therefore, the purpose for which will become clear later, there are also included a plurality of louvers, such as louvers 200, 202, 204, and 206 clearly shown in FIGS. 3 and 5. The louvers are created during the cutting or punching process by providing a cut line such as cut line 208, with respect to louver 200 and then slightly disrupting or distorting the sheet metal material away from the plane of the sheet in the direction which will become inwardly radial when combustion chamber 34 is fully formed and secured in its cylindrical shape. It will also be appreciated that when the tabs 184 through 190 are bent as shown in FIG. 3 so as to provide combination standoff tabs and mounting brackets there are slots or receiving notches created in the outward edge 182 of combustion chamber 34. These notches, such as notch 210 created by bending tab 186 into position, are sized to receive the legs on the planar rear head member 54, such as, for example, leg 212 which is received by notch 210. In the embodiment shown in FIGS. 3 and 5, rear head member has four legs corresponding to the four notches of combustion chamber 34. However, it would be appreciated that there could be more or fewer notches if desired. However, it should also be appreciated that for most arrangements, there should be at least three equally-spaced legs and notches to stabilize the rear head member 54 once in place with respect to combustion chamber 34. However, prior to assembly of the rear head 54 with the combustion chamber 34 target disk member 68 is first attached to the face of the rear head 54 which would be internal to the combustion chamber. The target disk 68 may be attached to the rear head member 54 by any suitable fastening means including screws, rivets, brads, or metal disruption between the legs of the target disk 68 and mounting holes adjacent the center opening 214 in rear head member 54. Once target disk 68 is in place, then the combination burner pipe 64 and valve 62 should be assembled by pushing the end 66 of burner tube 64 through the opening 214 in rear head member 54. Once in place, the burner tube may be held securely by a screw or other attaching means which according to one embodiment will extend through a hole in one of the side tabs of the target disk 68 into the hole 216 of burner tube 64. In addition, as shown, the body of the igniter electrode 70 along with its lead wire 218 is threaded through a mounting hole 220 in rear head member 54 and secured thereto by a fastening means, such as for example, screw 222. In a similar manner, the thermocouple 72 is located in a second mounting hole in rear head member 54 and then held in place by a nut 224. Also, as shown, an excessive heat thermostat 74 is attached to rear head member 54 by mounting screw 226 as shown in FIG. 3. After the target disk member 68, burner tube 64, start electrode 70, thermocouple 72 and thermostat 74 are mounted onto the rear head member 54, the legs of the rear head 54 are then simply placed in the notches or slots in the inlet and 182 of the combustion chamber 34. The diameter of the rear head 54 will be sized to have approximately, but slightly smaller diameter than the inside diameter of the cylindrical combustion chamber 34. Thus, when the rear head member 54 is placed in position it will meet resistance from the inwardly-extending louvers 200 through 206 formed in combustion chamber 34. However, it will be appreciated that the innermost bend lines of the tabs 184 through 190 will be a distance from the edge 182, which is slightly greater than the distance of the cut lines such as cut line 208 of the louvers. Thus, once the legs such as leg 212 of rear head member 54 is forced fully against the combination support and mounting brackets, such as mounting bracket 186, it will have moved past the cut line 208 of the louvers and therefore, securely held in position and thereby completing the assembly of the combustion chamber and burner.

Once assembled and once the separation plate 150 has been placed in position within the unichassis 10, the completed burner assembly may also be properly located within the unichassis 10. It will be appreciated that at this point, edge 126 of the unichassis has not been fastened or secured to its corresponding edges 128, 130, and 132. Therefore, the metal comprising the outer shell 12 can be sprung out of position to allow room for installation and positioning of the separator plate 150 and the combustion chamber 34. Once properly in place, separator plate 150 and the combustion chamber 34 can be secured in their proper position, such as by retaining screws 228 through mounting hole 148 of outer shell 12 and into the hole 196 of mounting bracket 186. At this point, the open edge 126 of the outer shell will also be secured to its corresponding edges 128, 130, and 132 by any appropriate fastening means, such as screws, brads, spot welding or metal disruption. Finally, the fan 38 which will be attached to motor 16 and which, in turn, is mounted to the wire bracket 18 in a suitable manner such as mounting bolts or the like, and as an example mounting screw 230 and nut 232. The assembled fan unit is then put in position such that the mounting bracket legs 234, 236, and 238 are aligned with the mounting holes 142, 240, and 242. The fan is then simply secured by mounting screws extending between the legs of the mounting bracket and the mounting holes. It should also be noted in a preferred embodiment of this invention, the screw extending through the leg 234 of the wire mounting bracket 18 and through hole 142 of the outer shell 12 is used as one of the attachment screws to the handle 32 thereby providing reinforcement which will help prevent the handle 32 being torn away from the heater outer shell.

The corresponding structures, materials, acts and equivalents of all means or step plus function elements in the claims below are intended to include any structure, material, or act for performing the function in combination with other claimed elements as specifically claimed.

What is claimed is:

1. A forced air heater comprising:
    a one-piece unichassis structure having a base and an outer housing formed of a first single sheet of metal, said outer housing defining an elongated passage there through with a front end and a back end; and
    a burner assembly comprising,
        an elongated combustion chamber defined by outer walls and having an inlet end, an outlet end and a length shorter than said elongated passage, said combustion chamber being located within, and at a selected spacing from said elongated passage to define an air passage around said combustion chamber,
        a rear head member cooperating with said inlet end and defining a substantially centrally located opening, and
        a combustion mixture supply member located in said opening of said rear head member for supplying a mixture of fuel and air for combustion in said combustion chamber.

2. The forced air heater of claim 1, wherein said one-piece unichassis structure further defines a channel portion between said base and the bottom of said outer housing having a substantially planar or flat bottom wall, and extending from said front end to said back end.

3. The forced air heater of claim 2, and further comprising a separation member between said base and said outer housing portion of said unichassis to further define said flat bottom of said air passage.

4. The forced air heater of claim 3, wherein said outer housing defines at least a portion of an elongated cylindrical cross section and said elongated combustion chamber is substantially cylindrical.

5. The forced air heater of claim 1, wherein said outer housing defines at least a portion of an elongated cylindrical cross section and said elongated combustion chamber is substantially cylindrical.

6. The forced air heater of claim 2, wherein said back end of said channel portion defines an auxiliary air inlet.

7. The forced air heater of claim 1, wherein said elongated combustion chamber is formed by joining a pair of longitudinal edges of a second single piece of material and further including a plurality of members also formed from and integral with said second single piece of material for centering and attaching said combustion chamber with respect to said outer housing.

8. The forced air heater of claim 7, wherein said one-piece unichassis structure further defines a channel portion between said base and the bottom of said outer housing and extending from said front end to said back end, and said front end of said channel portion defines an air diverter for diverting a flow of substantially unheated air downward and outwardly from the front end of said heater.

9. The forced air heater of claim 1, wherein said rear head member is substantially planar and defines legs extending from its perimeter and substantially radial from said centrally located opening.

10. The forced air heater of claim 1 and further including a fan unit installed at the back end of said outer housing to provide a flow of air through the interior of said combustion chamber and around said combustion chamber via said air passage.

11. A method of manufacturing a forced air heater comprising the steps of:
    cutting a unichassis pre-form from a single sheet of flat metal;
    bending said unichassis pre-form to form a base and an open outer housing, said outer housing suitable for defining an elongated passage there through with a front end and a back end when closed;
    cutting a combustion chamber pre-form having at least one set of parallel edges from a single sheet of metal;
    forming a substantially cylindrically shaped combustion chamber from said combustion chamber pre-form by joining the parallel edges and securing said parallel edges together;
    connecting tubing and a valve to a burner tube for supplying a combustion mixture to said burner tube;
    providing a substantially planar rear head member which defines a substantially centrally located opening for receiving an end of said burner tube;
    assembling said combustion chamber, said rear head member, and said burner tube, tubing and valve as a burner assembly;
    selectively positioning said burner assembly in said outer housing; and closing and fastening said outer housing around said burner assembly to form an air passage between said combustion chamber and said outer housing.

12. The method of claim 11 and further comprising the step of installing a separation member between said outer housing and said base prior to said closing and fastening step to further define said air passage.

13. The method of claim 11, wherein said cutting steps are accomplished by a punch press.

14. The method of claim 12, wherein said separation member is cut from scrap metal left over from cutting said unichassis.

15. The method of claim 11 and further comprising the step of pre-painting said sheet of flat metal prior to cutting said unichassis pre-form.

16. The method of claim 11 wherein said substantially cylindrically-shaped combustion chamber has a selected inside diameter, a front end, a rear end, and further defines notches in the walls of said cylindrically-shaped combustion chamber at said rear end; and wherein said substantially planar rear head member has substantially a disk shape with an outside diameter less than said inside diameter of said combustion chamber and further defines legs extending radially from said head member for being received by said notches defined in said combustion chamber.

17. A forced air heater comprising:
a one-piece unichassis structure having a base, an outer housing and a channel portion all formed of a first single sheet of metal, said outer housing defining an elongated passage there through with a front end and a back end, said channel portion formed between said base and the bottom of said outer housing and extending from said front end to said back end, and said channel portion and the bottom of said outer housing being joined at two parallel junctures substantially parallel to said elongated passage, one of said parallel junctures being a continuous bend in said single sheet of metal and said other juncture being edges of said single sheet of metal joined together;
a burner assembly comprising,
an elongated combustion chamber defined by outer walls and having an inlet end, an outlet end and a length shorter than said elongated passage, said combustion chamber being located within, and at a selected spacing from said outer housing to define an air passage around said combustion chamber,
a rear head member cooperating with said inlet end and defining a substantially centrally located opening, and
a combustion mixture supply member located in said opening of said rear head member for supplying a mixture of fuel and air for combustion in said combustion chamber.

18. The forced air heater of claim 17, wherein the diameter of said substantially cylindrical cross section of said outer housing is determined by the width of said channel portion.

19. A forced air heater comprising:
a one-piece unichassis structure having a base, an outer housing and a channel portion all formed of a first single sheet of metal, said outer housing defining an elongated passage there through with a front end and a back end, said channel portion formed between said base and the bottom of said outer housing and extending from said front end to said back end, and said front end of said channel portion defining an air diverter for diverting a flow of substantially unheated air downward and outward from said front end of said heater; and
a burner assembly comprising,
an elongated combustion chamber defined by outer walls and having an inlet end, an outlet end and a length shorter than said elongated passage, said combustion chamber being located within, and at a selected spacing from said outer housing to define an air passage around said combustion chamber,
a rear head member cooperating with said inlet end and defining a substantially centrally located opening, and
a combustion mixture supply member located in said opening of said rear head member for supplying a mixture of fuel and air for combustion in said combustion chamber.

20. The forced air heater of claim 19 and further including a fan unit installed at the back end of said outer housing to provide a flow of air to the interior of said combustion chamber, around said combustion chamber via said air passage and to said air diverter.

21. A forced air heater comprising:
a one-piece unichassis structure having a base and an outer housing, said outer housing defining an elongated passage there through with a front end and a back end; and
a burner assembly comprising:
an elongated combustion chamber defined by outer walls and having an inlet end, an outlet end and a length shorter than said elongated passage, said combustion chamber being located within, and at a selected spacing from said elongated passage to define an air passage around said combustion chamber, said elongated combustion chamber formed from a single piece of metal and further including, a plurality of members also formed from and integral with said single piece of metal at the inlet end of said combustion chamber so as to form receiving notches;
a substantially planar rear head member defining a substantially centrally located opening, and further defining legs extending substantially radially from its perimeter, said legs being received by said receiving notches at said inlet end of said combustion chamber such that said rear head member is positioned substantially perpendicular to said elongated combustion chamber and inset axially from set inlet end;
a combustion mixture supply member located in said opening of said rear head member for supplying a mixture of fuel and air for combustion in said combustion chamber.

22. The forced air heater of claim 21, wherein material of said combustion chamber extends from said rear head member of said inlet end and operates as an air scoop to increase the airflow into said combustion chamber.

23. The forced air heater of claim 21 and further comprising inwardly directed detents or louvers formed into the inlet end of said combustion chamber by deforming the material of said combustion chamber between said planar rear head and the inlet end for locking said rear head in position.

24. A forced air heater comprising:
a one-piece unichassis structure forming a base and an outer housing, said outer housing defining an elongated passage there through with a front end and a back end;
a burner assembly comprising:
an elongated combustion chamber defined by outer walls and having an inlet end, an outlet end and a length shorter than said elongated passage, said combustion chamber being located within, and at a selected spacing from said elongated passage to define an air passage around said combustion chamber;
a rear head member cooperating with said inlet end and defining a substantially centrally located opening;

a combustion mixture supply member located in said opening of said rear head member for supplying a mixture of fuel and air for combustion in said combustion chamber; and a fan unit installed at the back end of said outer housing to provide a flow of air to the interior of said combustion chamber and around said combustion chamber via said air passage, said fan unit including a support bracket for mounting to said outer housing; and a handle attached to the top of said outer housing at an attaching point reinforced by said mounting bracket of said fan unit.

\* \* \* \* \*